Sept. 27, 1966  A. STANYA  3,274,822

APPARATUS FOR ULTRASONIC TESTING

Filed Feb. 19, 1963  2 Sheets-Sheet 1

INVENTOR.
ANDREW STANYA
BY W. H. Woodlief
ATTORNEY

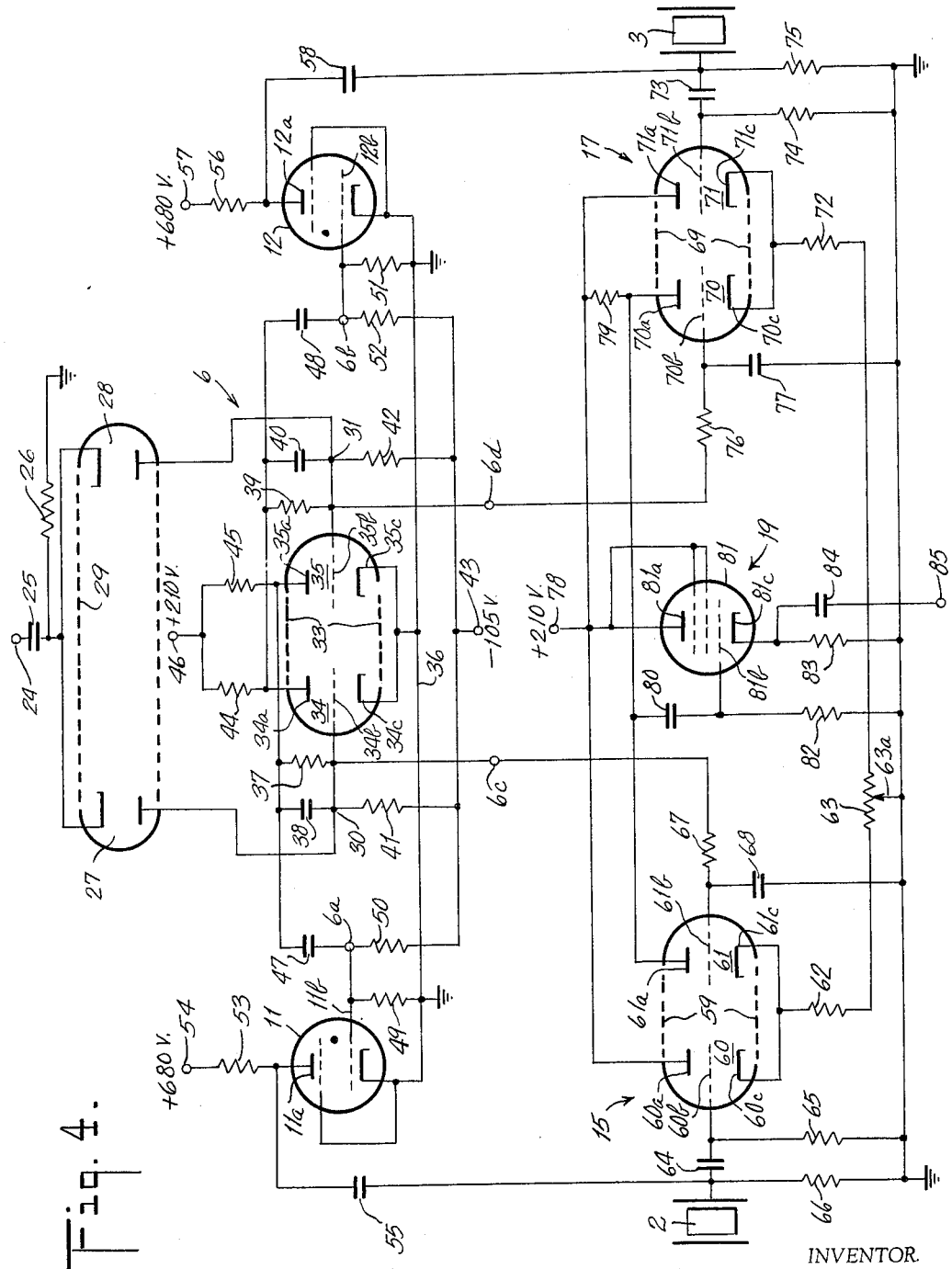

United States Patent Office 3,274,822
Patented Sept. 27, 1966

3,274,822
APPARATUS FOR ULTRASONIC TESTING
Andrew Stanya, South Euclid, Ohio, assignor to Republic Steel Corporation, Cleveland, Ohio, a corporation of New Jersey
Filed Feb. 19, 1963, Ser. No. 259,595
2 Claims. (Cl. 73—67.9)

This invention relates to the ultrasonic testing of bodies having complex surfaces, especially ribbed or beaded surfaces. It is illustrated herein as applied to pulse echo ultrasonic testing of welded pieces, for example, pipe welds.

In the ultrasonic inspection of bodies having irregular surfaces, such as welded bodies having a bead along the surface at the weld, echoes may be produced either by the bead or by a flaw, and it is necessary to arrange the transducer or transducers so that echoes from the rib or bead will not confuse the indication or record, so as to indicate the presence of a flaw when there is no flaw.

Considering the ultrasonic testing of a welded piece having a bead along the weld, if a transducer is placed in operative relation with the work piece at a point spaced from the weld and a beam of ultrasonic pulses is directed toward the weld, then there is a reflection of each pulse from the surface of the bead at the far side of the weld from the transducer. Since reflection of the ultrasonic pulses is relied upon to detect flaws in the weld structure, it is difficult to tell with only one transducer, whether the echoes observed are from a flaw or simply from the far side of the weld bead. In order to overcome that difficulty, it has been proposed to use two transducers, located on opposite sides of the weld. Both transducers direct beams of pulses toward the welded joint. If two such transducers are placed in line on opposite sides of the weld, and produce pulses simultaneously or nearly so, then their respective pulse beams become confused with reflections from the weld and make the indication practically unintelligible. It has therefore been the practice to separate the two transducers by approximately two to four inches along the weld so as to avoid interference between the two beams of pulses. The two transducers do not then test the same section of weld at the same time. Consequently, it is necessary to use two recorders or indicators, one for each transducer, in order to tell which transducer is observing a flaw, so that the exact location of the flaw, lengthwise of the weld, may be determined. The testing is further complicated at the ends of the weld because the two transducers do not start and end the test together.

It is an object of the present invention to provide an improved apparatus for ultrasonic testing of bodies having irregular surfaces, such as ribbed or beaded surfaces.

Another object of the invention is to provide an improved apparatus for the pulse echo ultrasonic testing of welded joints having beaded surfaces.

Another object is to provide apparatus for ultrasonic testing of ribbed or beaded bodies in which two transducers are aligned with each other on the opposite sides of the joint to be tested.

Another object is to provide apparatus of the type described in which the two transducers are alternatively activated so that there is no interference between them.

Another object of the invention is to provide an ultrasonic testing apparatus in which a single source of pulse signals and a single indicator may effectively cooperate with two transducers aligned with each other and oppositely directed.

The foregoing and other objects of the invention are attained in the methods and apparatus described herein. In that apparatus, a source of electrical pulses supplies pulse signals to the input of a bistable multivibrator having two complementary pulse outputs controlling a pair of thyratrons for driving two aligned and oppositely directed ultrasonic transducers. Each transducer produces a beam of pulses in the body to be tested, and also receives echoes of reflected pulses from that body. Each transducer is connected to one input of one of a pair of coincidence circuits. The other input of each coincidence circuit is connected to one of two complementary square wave outputs of the bistable multivibrator, so that each coincidence circuit can pass signals from its associated transducer only during alternate half cycles of the multivibrator operation. Hence, during one set of half cycles, one transducer is pulsed at the beginning of the half cycle and is effective to receive echoes during the remainder of that half cycle. At the beginning of the next half cycle, the other transducer is pulsed and then remains effective during the remainder of that next half cycle to receive pulses. Only one coincidence circuit can produce an output during any half cycle. The outputs of the two coincidence circuits are connected to inputs of a mixer circuit whose output is connected to a recording or indicating device, typically an oscilloscope.

The oscilloscope records the initial pulses at both transducers and the echo pulses received by both transducers.

Other objects and advantages of the invention will become apparent from a consideration of the following specification and claims, taken together with the accompanying drawings.

In the drawings:

FIG. 4 is a wiring diagram of the apparatus shown in FIG. 3 as a block diagram.

Figure 1:
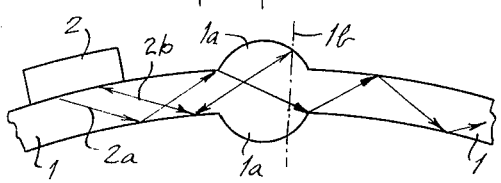
FIG. 1 is a somewhat diagrammatic fragmentary cross-section of a longitudinally welded pipe, showing a single ultrasonic transducer and the paths of ultrasonic waves from the transducer.

Referring to FIG. 1, there is shown in transverse cross-section, a metal pipe 1 welded longitudinally along a seam characterized by beads 1a at both surfaces of the pipe 1. To test the pipe 1 for the presence of flaws in the weld, a transducer 2 is placed in contact with the pipe at one side of the weld and is energized to produce a beam of ultrasonic pulses which pass through the material of the pipe. Two paths 2a, 2b of beams produced by the transducer 2 are shown diagrammatically. It may be seen that the beam 2a is reflected alternately from the inner and outer surfaces of the pipe. It passes the beads 1a between reflections, and continues around the pipe. The beam 2b, on the other hand, impinges on the side of the outer bead 1a and is reflected back toward the transducer. Because of this reflection, the only portion of the weld which can be effectively tested by transducer 2 is that portion between the transducer and the dotted line 1b, where the seam side becomes steep enough to reflect the beam 2b, as shown. The transducer 2 cannot effectively test for flaws located to the right of line 1b, as viewed in FIG. 1.

If there is a flaw in the material of the pipe 1 along the weld seam, it produces a similar echo wave which impinges in a similar fashion on the transducer 2. In the past, it has been difficult to separate the indications produced by the echoes from the sides of the bead from the indications produced by flaws in the weld. That separation is accomplished in accordance with the present invention by utilizing two transducers 2 and 3, located in alignment with each other on opposite sides of the weld bead 1a, and energizing the two transducers alternately. Each transducer is made sensitive to reflected signals for a predetermined time after it produces an ultrasonic pulse. During that time, the other transducer is made insensitive. Consequently, the signals from the two transducers cannot interfere.

Figure 2:
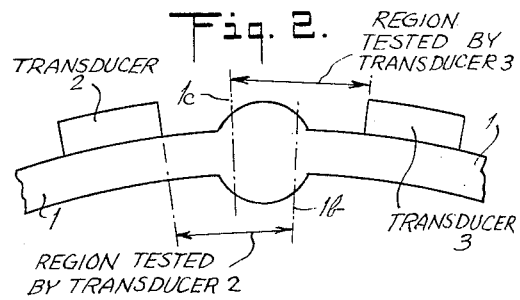
FIG. 2 is a view similar to FIG. 1, showing two transducers on opposite sides of the weld.

Transducer 2 tests the pipe to the left of line 1b, while transducer 3 tests the pipe to the right of line 1c (see FIG. 2). Consequently, the entire region of the seam is completely tested.

In the operation of the present invention, the workpiece being tested is moved past a head structure supporting the two transducers. The rate of movement of the workpiece past the transducers must be coordinated with the frequency of energization of the transducers and with the width of the beam of ultrasonic pulses so that all parts of the weld seam being tested are covered at least once by the ultrasonic beams. For example, in one testing arrangement constructed in accordance with the present invention, the workpiece traveled at a speed of 100 feet per minute, the beam width was ¼", and the energization of the two transducers was controlled at a frequency of 1200 cycles per second. That is to say, each transducer was activated 600 times per second, with the periods of activation of the two transducers alternating.

Figure 3:
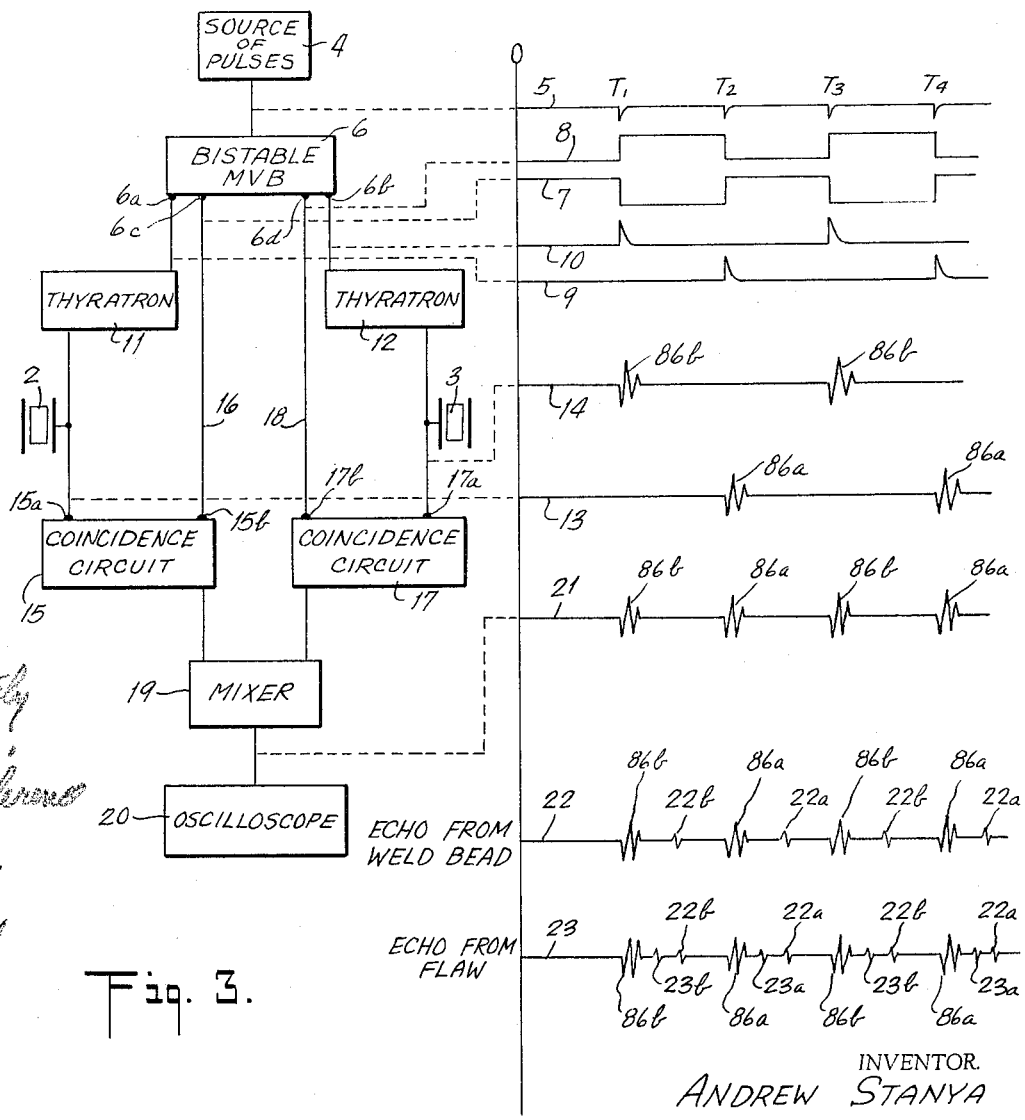
FIG. 3 is a schematic illustration including a block diagram of an ultrasonic testing apparatus according to the present invention, together with a graphical illustration of electrical potentials occurring at different points in the block diagram.

FIG. 3 shows in block diagram form a circuit for energizing the transducers 2 and 3 in accordance with the present invention, and also illustrates graphically the waveforms encountered at various points in the circuit. A source 4 of peaked electrical pulses such as shown at 5 supplies those pulses to the input of a bistable multivibrator 6. The multivibrator 6 has a pair of complementary peak pulse output terminals 6a and 6b, and a pair of complementary square wave output terminals 6c and 6d whose output waveforms are respectively shown at 7 and 8. The peaked output waves produced at the terminals 6a and 6b are respectively shown at 9 and 10.

The peaked output pulses from the terminals 6a and 6b are connected to the gate electrodes of two thyratron drivers 11 and 12, which respectively drive the transducers 2 and 3. The pulses supplied to the transducers 2 and 3 are graphically illustrated at 13 and 14 respectively. The electrical signals appearing at transducer 2 are supplied to a coincidence circuit 15 at input terminal 15a. The circuit 15 has another input terminal 15b supplied directly by a wire 16 from the square wave output terminal 6c of multivibrator 6.

Similarly, the waveform at the transducer 3 is supplied to input terminal 17a of a coincidence circuit 17, which has another input terminal 17b supplied directly from the square wave output terminal 6d of multivibrator 6 through a wire 18.

The outputs of the two coincidence circuits 15 and 17 are connected directly to the two inputs of a mixer circuit 19, whose output is supplied to an indicating or recording device such as an oscilloscope 20. The wave appearing at the input of oscilloscope 20, at a time when there are no reflected signals received at the transducer, is shown at 21, including driving pulses 86a, 86b. When both transducers are receiving echoes from the opposite sides of the weld bead, the signal appearing at the oscilloscope is that shown at 22. This includes the driving pulses 86a, 86b of the curve 21 plus the echo pulses appearing at 22a and 22b. It should be understood that the echo pulses 22a are received at the transducer 2 and the echo pulses 22b are received at the transducer 3. When a flaw appears between the two transducers, its echo appears at a different location than the echo from the bead. The waveform then resulting is similar to that shown at 23, and includes not only the bead echoes 22a and 22b, but also flaw echoes 23a and 23b. While the echo pulses 23b and 23a are shown substantially halfway between the input pulses 86a, 86b, and the echo pulses 22a and 22b, it should be understood that the exact location of these echo pulses will depend on the location of the flaw, and that the locations of the pulses 23a between their respective signal pulses and echo pulses 22a will not necessarily be the same as the locations of the echo pulses 23b.

Referring to FIG. 4, a series of square wave pulses of any suitable type is connected to an input terminal 24 and passes through a differentiating circuit including a capacitor 25 and a resistor 26, which converts the square wave pulses to peaked pulses. The peaked pulses of one polarity only pass through one or the other of a pair of steering diodes 27 and 28, which may be opposite halves of a twin diode 29, to input terminals 30 and 31 of the multivibrator 6 which includes a twin triode 33.

The twin triode 33 includes a triode 34 having an anode 34a, a control electrode 34b and a cathode 34c; and a triode 35 including an anode 35a, a control electrode 35b and a cathode 35c. The two cathodes 34c and 35c are connected to a grounded wire 36. The control electrodes 34b and 35b are respectively connected to the two input terminals 30 and 31, which are in turn respectively connected to the anodes of diodes 27 and 28. The control electrode 34b is coupled to the anode 35a through a parallel resistor 37 and capacitor 38. Control electrode 35b is coupled to anode 34a through a parallel resistor 39 and a capacitor 40. Resistors 41 and 42 connect the respective control electrodes 34b and 35b to a source of biasing potential having a terminal 43 and indicated as −105 volts. The anodes 34a and 35a are connected through load resistors 44 and 45 to a source of potential having a terminal 46 and indicated as +210 volts. The two anodes 35a and 34a are connected respectively through capacitors 47 and 48 to the complementary peak output terminals 6a and 6b, which are in turn connected respectively to the control electrodes 11b and 12b of thyratrons 11 and 12. Control electrode 11b is also connected through a resistor 49 to ground and through a resistor 50 to the terminal 43 of the biasing potential source. Control electrode 12b is connected through a resistor 51 to ground and through a resistor 52 to the terminal 43. Anode 11a of thyratron 11 is connected through a resistor 53 to a terminal 54 of a source of potential indicated as +680 volts. Anode 53 is also connected through a capacitor 55 to the transducer 2.

Anode 12a of thyratron 12 is connected through a resistor 56 to a terminal 57 of a potential source indicated as +680 volts and through a capacitor 58 to the transducer 3. Control electrode 34b is connected to square wave output terminal 6c of the multivibrator 6 and control electrode 35b is connected to square wave output terminal 6d.

Coincidence circuit 15 includes a twin triode 59 comprising a triode 60 having an anode 60a, control electrode 60b and a cathode 60c; and a triode 61 having an anode 61a, control electrode 61b and a cathode 61c. Cathodes 60c and 61c are connected together and through a resistor 62 and a resistor 63 having a slidable tap 63a to ground.

Transducer 2 is connected through a capacitor 64 to the control electrode 60b, which is also connected to ground through resistor 65. Transducer 2 is also connected to ground through a resistor 66. Square wave output terminal 6c of the multivibrator 6 is connected through a resistor 67 to control electrode 61b, which is also connected to ground through a capacitor 68.

Coincidence circuit 17 includes a twin triode 69 comprising a triode 70 having an anode 70a, a control electrode 70b and a cathode 70c, together with a triode 71 having an anode 71a, a control electrode 71b and a cathode 71c. Cathode 70c and 71c are connected together and through a resistor 72 and the resistor 63 and tap 63a to ground. Transducer 3 is connected through a capacitor 73 to control electrode 71b, which is also connected to ground through a resistor 74. Transducer 3 is also connected to ground through a resistor 75.

Square wave output terminal 6d of multivibrator 6 is connected through a resistor 76 to control electrode 70b, which is coupled to ground through a capacitor 77. The anodes 60a and 71a are connected to a terminal 78 of a source of potential indicated as +210 volts. The anodes 61a and 70a are connected together and through a resistor 79 to terminal 78.

Anodes 61a and 70a are connected through a coupling capacitor 80 to the control electrode 81b of a pentode 81 in the mixer circuit 19. Pentode 81 also has an anode 81a and a cathode 81c. Control electrode 81b is also connected to ground through a resistor 82. Anode 81a is connected to the potential supply terminal 78. Cathode 81c is connected to ground through a resistor 93 and is connected through a coupling capacitor 84 to an output terminal 85 which may be connected to oscilloscope 20 (FIG. 3).

*Operation*

When square waves are received at the input terminal 24, the differentiating circuit 25, 26, converts those square waves into alternate positive and negative peaked pulses. The diodes 27 and 28 are poled to pass only the negative peaked pulses.

The multivibrator 6 has two stable states, one state with triode 34 conducting and triode 35 non-conducting, and the other state with triode 35 conducting and triode 34 non-conducting. Assume for the purpose of explanation that at time "0" in FIG. 3 triode 34 is conducting and triode 35 is non-conducting. The anode 34a is then substantially more negative that the anode 35a, due to the potential drop across resistor 44. The voltage divider action involving resistors 44, 39 and 42 holds the junction 31 at a negative potential, so that diode 28 is reversely biased, and therefore cannot pass the next incoming negative pulse which appears at its cathode at time T₁. The voltage divider action through resistors 45, 37 and 41 is such that control electrode 34b is positively biased. Thus, diode 27 is forwardly biased and passes the next incoming negative going pulse at time T₁. This pulse is applied to control electrode 34b and is effective to cut off the flow of current through the triode 34, so that the anode 34a swings toward the potential of the terminal 46. This positive swing is transmitted through resistor 39 and capacitor 40 to control electrode 35b, where it is effective to turn the triode 35 ON, thereby swinging the anode 35a negative. This negative swing is coupled through resistor 37 and capacitor 38 to control electrode 34b, thereby holding the triode 34 OFF. The switching the two triodes occurs substantially instantly so that the potential at control electrode 34b and also at terminal 6c appears as a square wave, as shown at 7 in FIG. 3. The potential at control electrodes 35b and hence at terminal 6d also appears as a square wave, as shown at 8 in FIG. 3. The coupling capacitors 47 and 48 cooperate with the resistors 49 and 51, respectively, to differentiate the square wave pulses appearing at anodes 34a and 35a, so that only the peaks of those pulses appear at 6a and 6b. Only the positive going peaks at 6a and 6b are effective to trip the thyratrons 11 and 12. Consequently, the negative going peaks have been omitted from the curves 9 and 10. Capacitors 55 and 58 become charged to the supply potential during the periods while the thyratrons 11 and 12 are non-conducting. When either thyratron is tripped by the application of a positive pulse to its control electrode, the associated capacitor 55 or 58 is discharged through the thyratron until the potential at anode 11a or 12a drops to a point too low to keep the thyratron conducting. This discharge pulse through capacitor 55 or 58 is effective to initiate a high frequency oscillation at the transducer 2 or 3. This oscillation rapidly decays, as shown in lines 13 and 14.

An ultrasonic wave corresponding to this oscillation is transmitted through the workpiece and a reflection is received back from the far side of the beads 1a and also from any flaw which may appear in the weld, or elsewhere in the workpiece. This echo from the workpiece develops an electrical wave in the transducer 2 or 3 such as those appearing at 22a, 22b and 23a, 23b in FIG. 3.

The electrical wave forms appearing at the transducer 2, for example, are transmitted through capacitor 64 to the control electrode 60b of triode 60, where they are amplified and appear in amplified form across the load resistor 62. The control electrode 61b of cathode 61 is at this time positively biased by the potential from control electrode 34b of triode 34. Triode 61 consequently amplifies the wave form appearing across resistor 62 and transmits the amplified wave form to capacitor 80 to the control electrode 81b of pentode 81. Pentode 81 is connected as a cathode follower, and further amplifies the wave form in question, which appears across the cathode load resistor 83 and is transmitted through capacitor 84 to output terminal 85, which may be connected to an oscilloscope or other indicating or recording device.

Pentode 81 and its related circuit elements operate as a mixer 19, receiving signals for either anode 61a or anode 70a of the triode 61 or 70 and transmitting them to the output terminal 85. During each half cycle of the square waves shown in lines 7 and 8 of FIG. 3, one of the two triodes 61 and 70 is biased below cutoff by a negative potential transmitted from one of the output terminals 6c and 6d of the multivibrator 6. During the half cycle following the transmission of a driving pulse from transducer 2, the triode 70 is cut off. During the half cycle following transmission of a driving pulse from transducer 3, the triode 61 is cut off. Consequently, on each half cycle, only the output wave from one transducer is recorded at the output terminal 85. Thus the outputs of the two transducers do not interfere with each other.

Line 22 of FIG. 3 shows the output signal appearing at terminal 85 when there are echoes from the weld beads only. The driving pulses from transducer 2 appear at 86a and the echo pulses received at that transducer appear at 22a. The driving pulses from transducer 3 appear at 86b and the echo pulses at 22b.

Line 23 of FIG. 3 shows a signal received at output terminals 85 including echoes from both the weld bead, shown at 22a, 22b, and echoes from a flaw, shown at 23a, 23b. While, in this curve, the echoes 23a and 23b are shown spaced midway between the driving pulses 86 and the echo pulses 22 from the bead, it should be understood that the spacing of the echo pulses 22 will be somewhat irregular inasmuch as the side of the weld bead is somewhat irregular. Furthermore, the spacing of the echo pulse 23 from the flaw depends upon the lateral location of the flaw between the two transducers. The spacing shown would indicate that the flaw was equally spaced from the two transducers and also from the two sides of the weld bead. More typically, the spacing of the flaw would be asymmetrical with respect to the two transducers and with respect to the sides of the weld bead.

While I have shown and described a preferred embodiment of my invention, other modifications thereof will readily occur to those skilled in the art, and I therefore intend my invention to be limited only by the appended claims.

What is claimed is:

1. Apparatus for ultrasonic echo testing of a body having a rib on a surface thereof, comprising:
   (a) a first transducer in operative relation with the body on one side of the rib for directing a pulsed beam of ultrasonic waves through the body toward the rib and for receiving reflected pulses from discontinuities in the body or from the opposite side of the rib;
   (b) a second transducer aligned with said first transducer in operative relation with the body on the opposite side of the rib for directing a second pulsed beam of ultrasonic waves through the body toward the rib from said opposite side and for receiving reflected pulses from discontinuities in the body or from said one side of the rib;
(c) indicating means responsive to pulses received at said transducers;
(d) means for alternately energizing the transducers at separated intervals, comprising:
(1) a bistable circuit having a pair of complementary pulse output terminals such that pulses are generated alternately at the terminals;
(2) two drivers, one for each of the transducers; and
(3) two connections from said pair of complementary pulse output terminals to said drivers, so that the transducers are alternately energized by the drivers at separated intervals determined by the spacing of the pulses generated by the bistable circuit;
(e) blocking means effective upon the energization of each transducer and until the energization of the other transducer to prevent response of the said indicating means to pulses received at the other transducer, comprising:
(1) a pair of complementary square wave output terminals forming a part of said bistable circuit and generating alternate square wave signals in synchronism with said alternate pulses generated by said bistable circuit; and
(2) two coincidence circuits each having two inputs and an output, one input of each coincidence circuit being connected to one of the two transducers, and the other input of each coincidence circuit being connected to one of the square wave output terminals of the bistable circuit, so that upon energization of one transducer the transmission of pulses from the coincidence circuit connected to the other transducer is blocked until energization of said other transducer.

2. Apparatus as defined in claim 1, including a single output mixer having a pair of inputs, said inputs being connected to the outputs of said coincidence circuits.

References Cited by the Examiner

UNITED STATES PATENTS

| 2,893,239 | 7/1959 | Renaut | 73—67.7 |
| 3,050,988 | 8/1962 | Gordon et al. | 73—67.5 |

FOREIGN PATENTS

| 812,332 | 4/1959 | Great Britain. |
| 912,226 | 12/1962 | Great Britain. |
| 147,837 | 6/1962 | Russia. |

RICHARD C. QUEISSER, *Primary Examiner.*

JOHN P. BEAUCHAMP, *Assistant Examiner.*